United States Patent [19]
Hattori et al.

[11] Patent Number: 5,524,164
[45] Date of Patent: Jun. 4, 1996

[54] COATED TAPE FORM OPTICAL FIBER WIRE

[75] Inventors: Tomoyuki Hattori; Nobuhiro Akasaka; Tsuyoshi Nonaka; Kaori Nomura, all of Yokohama, Japan

[73] Assignee: Sumitomo Electric Industries, Ltd., Osaka, Japan

[21] Appl. No.: 302,863

[22] PCT Filed: Jan. 13, 1994

[86] PCT No.: PCT/JP94/00034

§ 371 Date: Oct. 31, 1994

§ 102(e) Date: Oct. 31, 1994

[87] PCT Pub. No.: WO94/16350

PCT Pub. Date: Jul. 21, 1994

[30] Foreign Application Priority Data

Jan. 14, 1993 [JP] Japan .................. 5-005236
Jan. 14, 1993 [JP] Japan .................. 5-005237
Dec. 7, 1993 [JP] Japan .................. 5-306429

[51] Int. Cl.$^6$ ............................................. G02B 6/44
[52] U.S. Cl. .................. 385/114; 385/100; 385/127; 385/128; 385/141
[58] Field of Search ........................... 385/100, 114, 385/127, 128, 141, 147

[56] References Cited

U.S. PATENT DOCUMENTS

| | | | |
|---|---|---|---|
| 4,828,349 | 5/1989 | Nakasuji | 385/114 X |
| 4,953,945 | 9/1990 | Nishimura et al. | 385/114 X |
| 5,062,685 | 11/1991 | Cain et al. | 385/114 X |
| 5,082,347 | 1/1992 | Akasaka et al. | 385/114 |

FOREIGN PATENT DOCUMENTS

| | | | |
|---|---|---|---|
| 2672699 | 8/1992 | France | 385/128 X |
| 60-134211 | 7/1985 | Japan | 385/114 X |
| 62-89915 | 4/1987 | Japan | 385/114 X |
| 62-98314 | 5/1987 | Japan | 385/114 X |
| 1138519 | 5/1989 | Japan | 385/114 X |
| 1150106 | 6/1989 | Japan | 385/114 X |
| 2-51108 | 2/1990 | Japan | 385/100 X |
| 2118608 | 5/1990 | Japan | 385/114 X |

*Primary Examiner*—Brian Healy
*Attorney, Agent, or Firm*—Cushman Darby & Cushman

[57] ABSTRACT

A tape form optical fiber wire comprising at least one set of at least two optical fibers each of which has a protective coating layer and which are arranged in parallel in the same plane, at least one set of the optical fibers being integrated by at least one common coating layer, in which the common coating layer contains a main component of a common coating resin and a component having a poor compatibility with the main component, in which wire, no strain is generated in the optical fibers when the wire is bent.

34 Claims, 2 Drawing Sheets

5,524,164

COATED TAPE FORM OPTICAL FIBER WIRE

FIELD OF THE INVENTION

The present invention relates to a tape form optical fiber wire. In particular, the present invention relates to a tape form optical fiber wire for fabricating a high density cable to be used as a telecommunication optical fiber cable.

DESCRIPTION OF THE PRIOR ART

In these years, with the expansion of optical communication networks, requirements for a higher density of an optical fiber cable are increasing to increase a transmission capacity. Demands for tape form optical fiber wires in which plural optical fibers are arranged in parallel and coated together are increasing, since they can achieve the high density easily by laminating them. Multi-coring of the tape form optical fiber wire has been studied in various ways. To make its handling easy, a tape form optical fiber wire which can be easily split to several wires is known from, for example, Japanese Patent KOKAI Publication No. 150106/1989 and 138519/1989.

With such optical fiber wire, it is easy to increase the density, while the wire has a problem that the optical fiber is strained when an optical fiber unit having a laminated structure is bent. This is because free movement of a common coating layer and the optical fibers is limited, so that local flexural strain is generated. To solve such problem, it is known to provide a cushioning layer between the optical fiber and its protective layer as disclosed in Japanese Patent KOKAI Publication No. 134211/1985, or it is known to assemble the common coating layer and the protective layer of the optical fiber or to coat or supply a material for reducing a coefficient of friction between the common coating layer and the protective layer, so as to reduce friction between them and make slipping easy between them.

However, with the increase of the number of the core optical fibers, a coefficient of friction between the tape form optical fiber wires becomes important. Japanese Patent KOKAI Publication No. 89915/1987 proposes the provision of a layer for reducing a coefficient of friction made of a material having a small coefficient of friction such as polytetrafluoroethylene, nylon, and the like. Japanese Patent KOKAI Publication No. 98314/1987 proposes the supply of a powder having a very small particle size such as talc, talcum powder, water-absorbing powder and the like between the layers. However, since all the proposals require an extra work in addition to the formation of the common coating layer, they have decreased workability and productivity.

SUMMARY OF THE INVENTION

An object of the present invention is to provide a tape form optical fiber wire in which no strain is generated in the optical fiber when the laminated wires are bent.

Another object of the present invention is to provide a tape form optical fiber wire which is excellent in productivity.

According to the present invention, the above objects are achieved by a tape form optical fiber wire comprising at least one set of at least two optical fibers each of which has a protective coating layer and which are arranged in parallel in the same plane, said at least one set of the optical fibers being integrated by at least one common coating layer, wherein said common coating layer contains a main component of a common coating resin and a component having a poor compatibility with said main component.

DETAILED DESCRIPTION OF THE DRAWINGS

Figure 3:
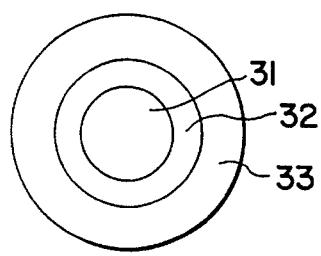
FIG. 3 is a cross sectional view of an example of an optical fiber.

Herein, an optical fiber is intended to mean preferably a quartz base optical fiber 1, which comprises, in general, a quartz glass fiber 31 having a core and a cladding and a protective coating layer around a peripheral surface of the glass fiber as shown in FIG. 3. In the case of the optical fiber 1 of FIG. 3, the protective coating layer has a soft resin layer 32 and a hard resin layer 33.

Figure 1A:
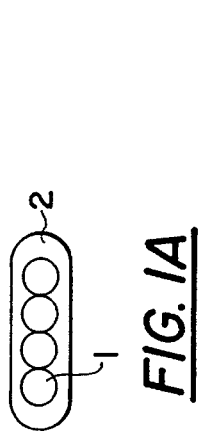
FIG. 1A is a schematic cross sectional view of one example of the tape form optical fiber wire of the present invention.
Figure 1B:
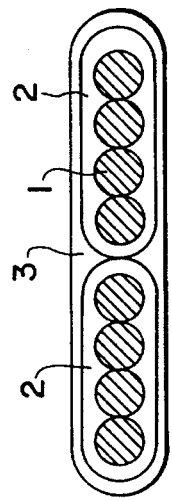
FIG. 1B is a schematic cross sectional view of another example of the tape form optical fiber wire of the present invention.
Figure 1C:
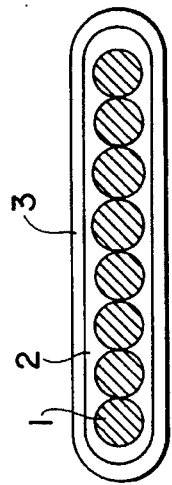
FIG. 1C is a schematic cross sectional view of a further example of the tape form optical fiber wire of the present invention.

A tape form optical fiber wire is intended to mean, for example, a wire comprising plural optical fibers 1 which are arranged in parallel and coated with common coating layers 2, 3, as shown in FIGS. 1A, 1B and 1C.

In the present invention, a conventional resin for coating optical fibers may be used as the main component of the common coating resin. Preferred examples of the coating resin are actinic radiation-curing resins (e.g. ultraviolet-curing resins), thermosetting resins, thermoplastic resins and the like. Among them, the actinic radiation-curing resins are preferred. Specific examples of the resin are urethane acrylate resins, epoxy acrylate resins, silicone acrylate resins, and the like. Among them, the urethane acrylate resins and the epoxy acrylate resins are preferred.

As the component having a poor compatibility with the main component, liquid organic materials, and organic or inorganic fine particles are preferably exemplified and selected according to a kind of the main component of the common coating resin.

A first kind of the component having the poor compatibility with the main component of the common coating resin is a liquid organic material which cannot be mixed with the main component of the common coating resin at an arbitrary ratio, and clouded or separated when it is used in a large amount.

Specific examples of such organic material are hydrocarbons having a large number of carbon atoms (e.g. 10 to 20 carbon atoms), silicone oils, fluorine-containing oils, and so on.

In a preferred embodiment, a reactive functional group (e.g. a vinyl group, an allyl group, a mercapto group, etc.) is introduced in the organic material, and incorporated in the common coating resin when the resin is cured.

When the urethane acrylate resin or the epoxy acrylate resin is used as the main component of the common coating resin, stearyl acrylate, silicone acrylate and the like can be used as the component having the poor compatibility.

In another preferred embodiment, a Young's modulus of the component having the poor compatibility which is cured alone is smaller than a Young's modulus of the main component of the common coating resin, and the component having the poor compatibility forms a discontinuous phase of 5 μm or less after curing the resin.

An amount of the liquid organic material having the poor compatibility is selected according to a combination with the main component of the common coating resin and is not limited in a specific way. In general, this amount is from about 0.05 to about 20% by weight, preferably from about 1 to about 15% by weight, more preferably from 3 to 10% by weight based on the total weight of the common coating resin composition.

A second kind of the component having the poor compatibility is organic or inorganic fine particles.

Examples of the organic fine particles are fine particles of organic polymers such as polyvinylidene fluoride, polyethylene, etc., and examples of the inorganic fine particles are silica, titanium white, carbon black, talc, etc.

A primary particle size of the fine particles is preferably from 0.1 to 5 μm. These file particles are secondarily agglomerated, that is, several particles are gathered and present in the form of a large lump which is larger than the discrete particle in the resin. In such case, a secondary particle size is preferably not larger than 5 μm.

An amount of the fine particles is not critical. In the present invention, the amount of the fine particles is usually from about 0.1 to about 50% by weight, preferably from about 1 to about 50% by weight, more preferably from about 10 to about 40% by weight based on the total weight of the coating resin composition.

The liquid organic materials having the poor compatibility are generally classified in (1) one that bleeds on a surface and (2) one that is phase separated when coated and cured.

In the latter case, the main component and the component having the poor compatibility form a so-called sea-island structure (continuous phase/discontinuous phase structure) on the surface of the resin layer. In this case, unevenness may appear on the surface of the common coating resin. A size of the island region (discontinuous phase) can be measured as a size of unevenness by the observation of the surface with a scanning electron microscope or an atomic force microscope. A size of the island region is preferably not larger than 5 μm. When the unevenness appears, a difference between a height of a high part and that of a low part is preferably not larger than about 5 μm.

When the component having the poor compatibility is the organic or inorganic fine particles, a size of the coagulated particles after the resin curing is preferably not larger than 5 μm, more preferably from 0.1 to 5 μm.

The optical fiber has a protective coating layer around a periphery of the quartz glass fiber as explained above. As shown in FIG. 3, in many cases, the protective coating layer is made of a combination of a soft resin layer 32 and a hard resin layer 33, and formed from a thermosetting resin or an ultraviolet-curing resin such as an epoxy acrylate resin, a urethaneacrylate resin or a silicone resin. For identification, each optical fiber may have a coloring layer as an outermost layer.

In the present invention, a thickness of the common coating layer containing the component having the poor compatibility is usually from 5 to 200 μm, preferably from 10 to 100 μm. When the common coating layer forms the outermost layer, its thickness is usually from 10 to 150 μm, preferably from 10 to 100 μm.

A method for producing the tape form optical fiber wire of the present invention will be explained by making reference to the accompanying drawing.

Figure 2:
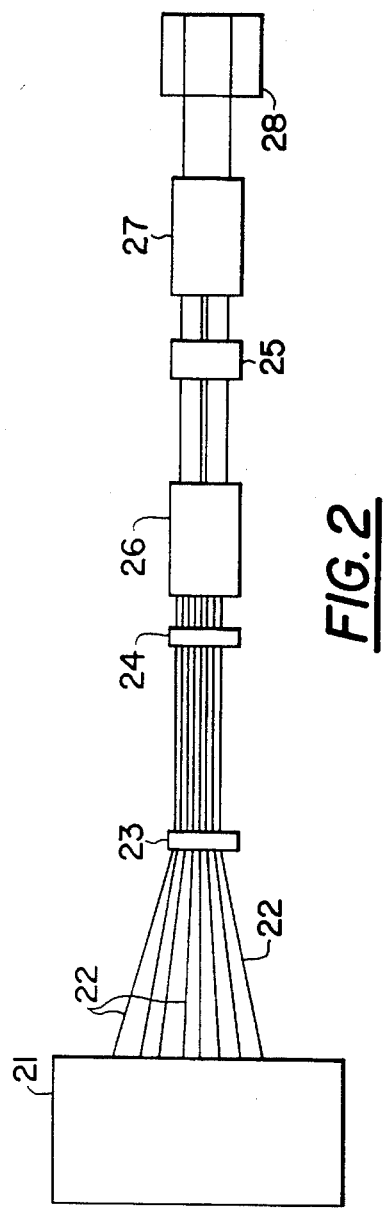
FIG. 2 is a schematic view of an apparatus for producing the tape form optical fiber wire of the present invention.

FIG. 2 schematically shows an apparatus for producing the tape form optical fiber wire of the present invention, which illustrates a supplier 21, optical fibers 22, a fiber collector 23, coating units 24 and 25, UV light radiators 26 and 27 which are UV lamps in this example, and a take-up roll 28.

In the present invention, the plural optical fibers 22 which are supplied from the supplier 21 are arranged in parallel in the same plane and commonly coated with the common coating resin comprising the ultraviolet-curing resin by the first coating unit 24. Then, the common coating resin is cured by the irradiation of the UV light from the UV lamp to form a common coating layer (an inner common coating layer) 2. When plural common coating layers are formed as shown in FIGS. 1B and 1C, an outer common coating resin comprising the ultraviolet-curing resin is applied by the second coating unit 25 and cured by the irradiation of the UV light from the UV lamp to form an outer common coating layer 3.

While all the optical fibers supplied from the supplier can be coated with the same common coating layer as shown in FIG. 1B, they may be separated in two or more groups and each group is coated with the common coating layer as shown in FIG. 1C, so that the optical fiber wire can be divided.

When the common coating layer has the inner common coating layer 32 and the outer common coating layer 33, the component having the poor compatibility may be contained in the outer layer, for example, the common coating layer 3 in FIGS. 1B and 1C, since the object of the present invention can be achieved by making the slipping between the tapes good.

When the common coating layer has a multiple layer structure as shown in FIGS. 1B and 1C and the outer common coating layer has a Young's modulus is smaller than that of the outer common coating layer, such structure is advantageous to obtain a stable transmission property, and it is easy to divide and separate the multicore tape form optical fiber wire.

EFFECTS OF THE INVENTION

In general, to decrease the coefficient of friction, the following three methods are known:

(i) Unevenness is formed on the surface to decrease an effective contact area;

(ii) A self-fusion property between the surfaces is suppressed. That is, the surface free energy is reduced;

(iii) A lubricating layer is provided between surfaces to be contacted.

In the tape form optical fiber wire of the present invention, the coefficient of friction is decreased by the addition of the component having the poor compatibility to form the lubricating layer on the surface of the coating layer. In particular, when the component having the poor compatibility is added, the coating layer is phase separated, so that the smoothness of the surface is deteriorated, whereby the effective contact area is decreased and the coefficient of friction is further decreased.

When the organic or inorganic fine particles are added, minute protrusions are formed on the surface so that the effective contact area is reduced, whereby the coefficient of friction is decreased further.

The tape form optical fiber wire having the low coefficient of friction does not suffer from the generation of flexural strain therein, when the number of the optical fiber cores is increased and the width of the tape is increased, or the tape form optical fiber wires are laminated to form an optical fiber unit and bent.

If the unevenness is formed on the surface of the coating layer by post processing after the production of the tape form optical fiber wire, the optical fiber cores may be damaged and the possibility of breakage of the fibers increases. But, since the friction of the common coating layer is reduced in the tape form optical fiber wire of the present invention, it is possible to avoid the processing for reducing the friction.

In addition, even when the unevenness is formed on the surface, the transmission property of the optical fiber is not influenced since the degree of unevenness is 5 μm or less.

According to the present invention, the slipping property of the tape form optical fiber wire can be improved, and the number of the optical fiber cores in the wire can be increased. Then, the density of the optical fiber cable can be easily increased.

PREFERRED EMBODIMENTS OF THE INVENTION

The present invention will be illustrated by the examples, which do not limit the scope of the present invention.

The optical fiber wire used in each example was produced as follows:

An optical fiber wire was produced from optical fibers each comprising a glass fiber having an outer diameter of 125 μm which was coated with a urethane acrylate ultraviolet-curing resin as a protective layer and having an outer diameter of 250 μm, by the method shown in FIG. 2.

The used optical fiber was a single mode optical fiber having Δn of 0.3%. Before being assembled in a tape wire, each optical fiber had a loss of 0.21 dB/km.

As a liquid organic material, a silicone oil, a fluorine-containing oil, stearyl acrylate or silicone acrylate was used. As inorganic fine particles, silica was used. As organic fine particles, polyvinylidene fluoride fine particles were used.

EXAMPLE 1

In this Example, a common coating layer consisted of one layer as shown in FIG. 1A.

Table 1 shows the used common coating resin, unevenness of the surface, a transmission loss at a wavelength λ of 1.55 μm (an average value of the measured values of all the fibers) and a coefficient of friction (a relative value with that of Comparative Example 1 in which no component having the poor compatibility was used being 1 (one)).

Figure 4A:
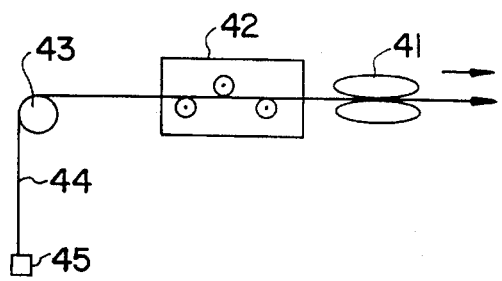
FIG. 4A shows an apparatus used for measuring a coefficient of friction in Examples.
Figure 4B:
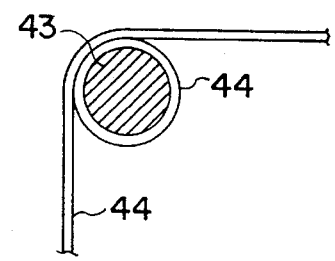
FIG. 4B is an enlarged view of a mandrel part of the apparatus of FIG. 4A.

The coefficient of friction was measured using the apparatus shown in FIGS. 4A and 4B. As shown in FIG. 4A, the tape form optical fiber wire 44 was wound around a mandrel 43 having a small diameter by one and a quarter turns. To one end of the wire 44, a weight 45 was suspended, while the other end was pulled at a constant rate by clamping it by a capstan 41. Then, a tension was measured by a tensiometer 42. The coefficient of friction μ was calculated by the following formula:

$$\mu = (2/\pi)\ln(T/W)$$

where W is a weight (g) of the weight and T is a tension (g).

The coefficient of friction shown in FIG. 1 was measured with W of 50 g and the pulling rate of 1 m/min.

TABLE 1

| | Example No. | | | | | | | | |
|---|---|---|---|---|---|---|---|---|---|
| | 1-1 | 1-2 | 1-3 | 1-4 | 1-5 | 1-6 | 1-7 | 1-8 | C. 1 |
| Common coating resin composition (wt. %) Main component | | | | | | | | | |
| Urethane acrylate | 94 | 92 | 95 | — | 95 | 90 | 97 | 60 | 100 |
| Epoxy acrylate | — | — | — | 90 | — | — | — | — | — |
| Additive | | | | | | | | | |
| Silicone oil | 6 | — | — | — | — | 10 | 3 | — | — |
| F-cont. oil | — | 8 | — | — | — | — | — | — | — |
| Stearyl acrylate | — | — | 5 | — | — | — | — | — | — |
| Silicone acrylate | — | — | — | — | 5 | — | — | — | — |
| Silica | — | — | — | 10 | — | — | — | 40 | — |
| Transmission loss after production (dB/km)*[1] | 0.21 | 0.22 | 0.23 | 0.23 | 0.23 | 0.22 | 0.21 | 0.23 | 0.21 |
| Unevenness (μm) (difference between the high part and the low part) | <0.5 | <0.5 | <2 | <5 | <1 | <2 | <0.5 | <5 | <0.1 |
| Coefficient of friction*[2] | 0.7 | 0.6 | 0.6 | 0.4 | 0.7 | 0.5 | 0.8 | 0.4 | 1 |

Note:
*[1] Transmission loss at the wavelength of 1.55 μm. An average value of four optical fibers.
*[2] A relative value with the value of Comparative Example 1 being 1 (one).

EXAMPLE 2

As shown in FIG. 1C, four optical fibers were coated and then two sets of the optical fibers were together coated, by the common coating layers.

Table 2 shows the used common coating resin, unevenness of the surface, a transmission loss at a wavelength λ of 1.55 μm (an average value of the measured values of all the fibers) and a coefficient of friction (a relative value with that of Comparative Example 2-1 in which no component having

TABLE 2

| | Example No. | | | | | | | | |
|---|---|---|---|---|---|---|---|---|---|
| | 2-1 | 2-2 | 2-3 | 2-4 | 2-5 | 2-6 | 2-7 | C. 2-1 | C. 2-2 |
| Common coating resin composition (wt. %) Main component | | | | | | | | | |
| Urethane acrylate | 90 | 88 | — | 95 | 95 | 90 | 97 | 100 | — |
| Epoxy acrylate | — | — | 95 | — | — | — | 55 | — | 40 |
| Additive | | | | | | | | | |
| Silicone oil | — | — | — | — | — | 10 | — | — | — |
| Stearyl acrylate | 10 | 12 | — | — | — | — | — | — | — |
| Silicone acrylate | — | — | 5 | — | — | — | — | — | — |
| Polyvinylidene fluoride | — | — | — | — | 5 | — | 45 | — | 60 |
| Silica | — | — | — | 5 | — | — | — | — | — |
| Transmission loss after production (dB/km)[*1)] | 0.21 | 0.22 | 0.22 | 0.22 | 0.22 | 0.21 | 0.23 | 0.21 | 0.35 |
| Unevenness (μm) (difference between the high part and the low part) | <1 | <1 | <2 | <5 | <5 | <0.5 | <5 | <0.1 | 5–10 |
| Coefficient of friction[*2)] | 0.6 | 0.5 | 0.7 | 0.7 | 0.8 | 0.5 | 0.5 | 1 | 0.4 |

Note:
[*1)]Transmission loss at the wavelength of 1.55 μm. An average value of eight optical fibers.
[*2)]A relative value with the value of Comparative Example 2-1 being 1 (one).

What is claimed is:

1. A tape form optical fiber wire comprising at least one set of two optical fibers each fiber having a protective coating layer, the fibers being arranged in parallel in the same plane, said set of optical fibers being integrated by at least one common coating layer containing a first component made of a common coating resin and a second component having a poor compatibility with said first component, said second component forming a discontinuous phase having a size of 5 μm or less after said common coating resin is cured.

2. The tape form optical fiber wire according to claim 1, wherein said common coating layer containing said second component forms an outermost layer.

3. The tape form optical fiber according to claim 1, wherein said common coating layer containing said second component has minute unevenness on its surface.

4. The tape form optical fiber wire according to claim 1, wherein said common coating resin is an actinic radiation-curing resin.

5. The tape form optical fiber wire according to claim 1, wherein said second component is a liquid organic material.

6. The tape form optical fiber wire according to claim 5, wherein said second component is a silicone oil or a fluorine-containing oil.

7. The tape form optical fiber wire according to claim 1, wherein said second component is an organic material having a reactive functional group, and a cured material of said component has a Young's modulus smaller than that of said first component.

8. The tape form optical fiber wire according to claim 5, wherein said second component is contained in an amount of 0.05 to 20% by weight based on the total weight of a common coating resin composition.

9. The tape form optical fiber wire according to claim 1, wherein said second component comprises fine particles.

10. The tape form optical fiber wire according to claim 9, wherein said second component comprises fluorine-containing organic material or hydrocarbon fine particles.

11. The tape form optical fiber wire according to claim 9, wherein said second component comprises inorganic fine particles.

12. The tape form optical fiber wire according to claim 9, wherein said second component comprises fine particles and forms an agglomerated structure after said common coating resin is cured.

13. The tape form optical fiber wire according to claim 9, wherein said second component is contained in an amount of 0.1 to 50% by weight based on the total weight of said common coating resin composition.

14. A tape form optical fiber wire comprising at least one set of two optical fibers each fiber having a protective coating layer, the fibers being arranged in parallel in the same plane, said set of optical fibers being integrated by at least one common coating layer containing a first component made of a common coating resin and a second component with said first component being made of a liquid organic material which is contained in an amount of 0.05 to 20% by weight based on a total weight of said common coating resin composition.

15. The tape form optical fiber wire according to claim 14, wherein said common coating layer containing said second component forms an outermost layer.

16. The tape form optical fiber wire according to claim 14, wherein said common coating layer containing said second component forms an outermost layer and has a thickness of 10 to 150 μm.

17. The tape form optical fiber according to claim 14, wherein said common coating layer containing said second component has minute unevenness on its surface.

18. The tape form optical fiber wire according to claim 14, wherein said second component is an organic material having a reactive functional group, and a cured material of said second component has a Young's modulus smaller than that of said first component.

19. The tape form optical fiber wire according to claim 14, wherein said second component comprises fine particles.

20. The tape form optical fiber wire according to claim 19, wherein said second component comprises a fluorine-containing organic material or hydrocarbon fine particles.

21. The tape form optical fiber wire according to claim 19, wherein said second component comprises fine particles and forms an agglomerated structure having a size of 5 μm or less after said common coating resin is cured.

22. The tape form optical fiber wire according to claim 19, wherein said second component is contained in an amount of 0.1 to 50% by weight based on the total weight of said common coating resin composition.

23. A tape form optical fiber wire comprising at least one set of two optical fibers each fiber having a protective coating layer, the fibers being arranged in parallel in the same plane, said set of optical fibers being integrated by at least one common coating layer containing a first component made of a common coating resin and a second component having a poor compatibility with said first component comprised of a plurality of fine particles.

24. The tape form optical fiber wire according to claim 23, wherein said common coating layer containing said second component forms an outermost layer.

25. The tape form optical fiber wire according to claim 23, wherein said common coating layer containing said second component forms an outermost layer and has a thickness of 10 to 150 μm.

26. The tape form optical fiber according to claim 23, wherein said common coating layer containing said second component has minute unevenness on its surface.

27. The tape form optical fiber wire according to claim 23, wherein said common coating resin is an actinic radiation-curing resin.

28. The tape form optical fiber wire according to claim 23, wherein said second component is a liquid organic material.

29. The tape form optical fiber wire according to claim 23, wherein said second component is a silicone oil or a fluorine-containing oil.

30. The tape form optical fiber wire according to claim 23, wherein said second component is an organic material having a reactive functional group, and a cured material of said component has a Young's modulus smaller than that of said first component.

31. The tape form optical fiber wire according to claim 23, wherein said second component comprises a fluorine-containing organic material or hydrocarbon fine particles.

32. The tape form optical fiber wire according to claim 23, wherein said second component comprises inorganic fine particles.

33. The tape form optical fiber wire according to claim 23, wherein said second component comprises fine particles and forms an agglomerated structure having a size of 5 μm or less after said common coating resin is cured.

34. The tape form optical fiber wire according to claim 23, wherein said second component is contained in an amount of 0.1 to 50% by weight based on the total weight of said common coating resin composition.

* * * * *